No. 841,525. PATENTED JAN. 15, 1907.
D. A. HUFFMAN.
ORDER FILE.
APPLICATION FILED MAR. 10, 1906.

2 SHEETS—SHEET 1.

No. 841,525. PATENTED JAN. 15, 1907.
D. A. HUFFMAN.
ORDER FILE.
APPLICATION FILED MAR. 10, 1906.
2 SHEETS—SHEET 2.
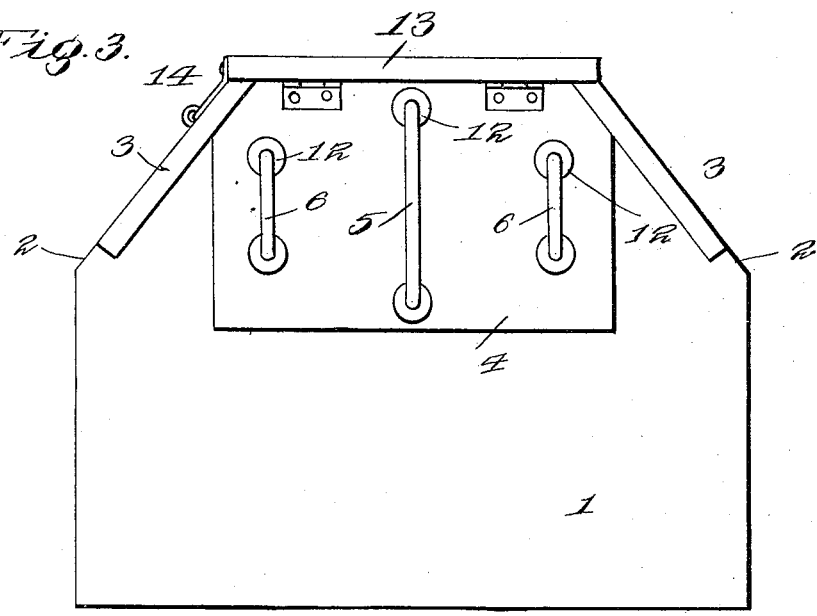
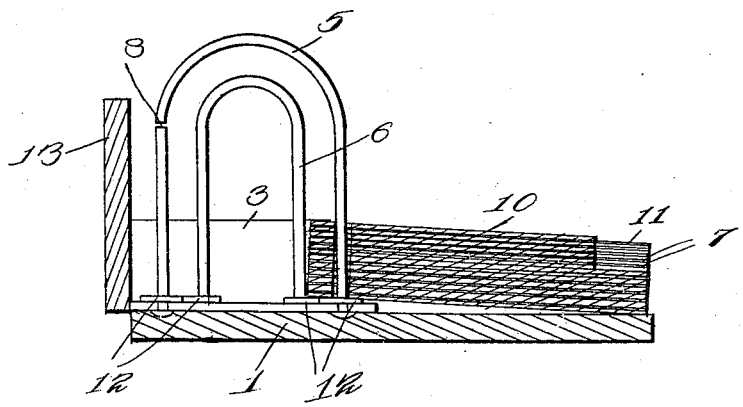
Witnesses
Inventor
D. A. Huffman
By
Attorneys

UNITED STATES PATENT OFFICE.

DAVID A. HUFFMAN, OF PARIS, ILLINOIS.

ORDER-FILE.

No. 841,525.　　　Specification of Letters Patent.　　　Patented Jan. 15, 1907.

Application filed March 10, 1906. Serial No. 305,378.

*To all whom it may concern:*

Be it known that I, DAVID A. HUFFMAN, a citizen of the United States, residing at Paris, in the county of Edgar and State of Illinois, have invented certain new and useful Improvements in Order-Files, of which the following is a specification.

This invention relates to an improved filing device which is especially adapted for the filing of order-blanks and which may replace the ordinary ledger for the keeping of business accounts.

The object of the invention is to provide a device of this character which will enable any one of the leaves to be readily removed or placed in position and which is so constructed as to prevent the leaves from becoming disarranged or lost.

For a full description of the invention and the merits thereof and also to acquire a knowledge of the details of construction of the means for effecting the result reference is to be had to the following description and accompanying drawings, in which—

Figure 1:
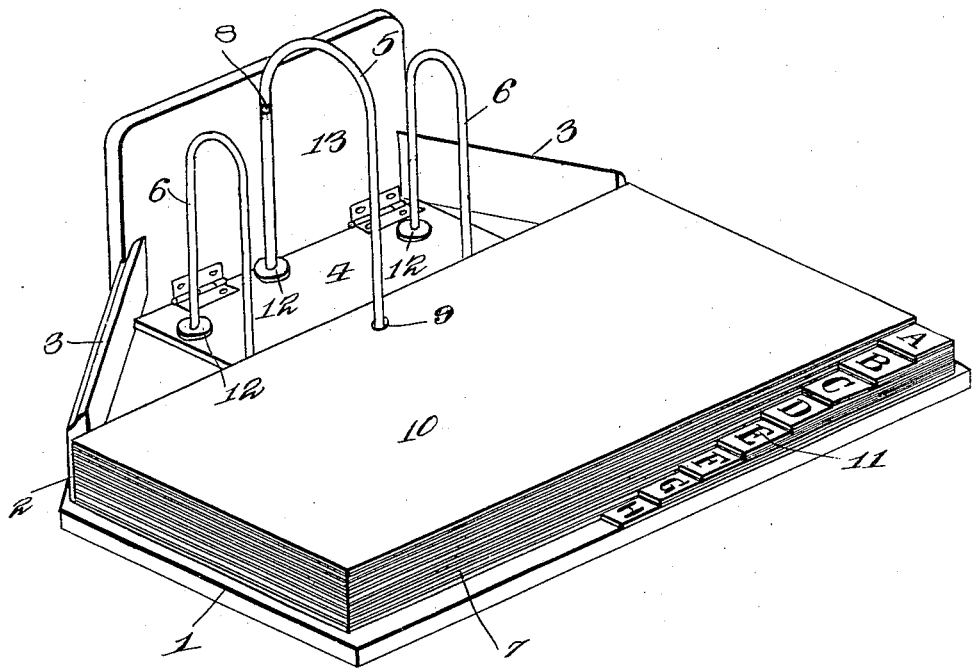
Figure 2:
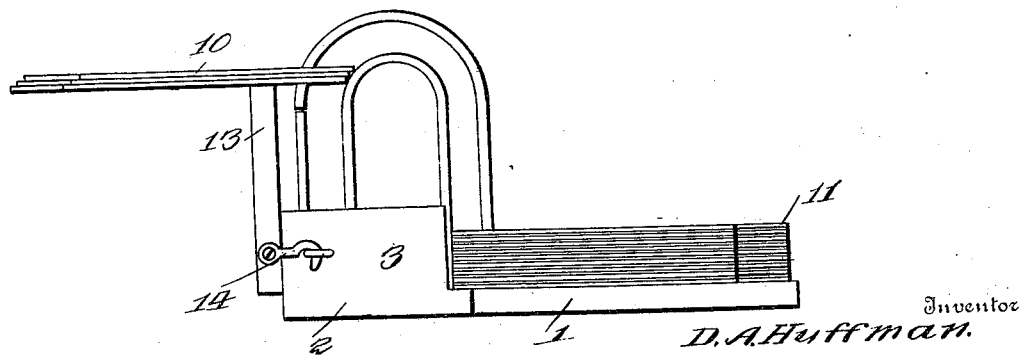

Figure 1 is a perspective view of the improved filing device. Fig. 2 is a side elevation of the same. Fig. 3 is a top plan view, the leaves being removed. Fig. 4 is a transverse sectional view.

Corresponding and like parts are referred to in the following description and indicated in all the views of the drawings by the same reference characters.

The numeral 1 designates the base, which is shown as approximately rectangular in shape and which has the rear corners thereof cut away, as shown at 2, and provided with upwardly-extending flanges or walls 3. The plate 4, to which the arch 5 and guides 6 are secured, is mounted upon the upper face of the base 1 and is preferably located between the walls 3. The arch 5 has an approximately inverted-U shape and comprises two approximately parallel arms, which are adapted to receive the leaves 7. The rear arm of the arch is provided with a break or opening 8, which admits of the leaves being readily removed or placed in position. Each of the leaves 7 is provided on one side with an opening 9, by means of which it is loosely mounted upon the arch. The account-leaves 7 are interposed between thicker leaves 10, which form a protection for the account-leaves and are provided on their outer edges with finger-pieces 11, which are lettered, so as to enable the operator to turn immediately to any desired leaf.

A guide member 6 is located upon each side of the arch 5 and has approximately the same shape as the arch, being somewhat smaller in size. These guide members or standards 6 are so located as to engage with the inner edges of the leaves and prevent them from being disarranged when in position. The arch 5 and guide members 6 are rigidly secured to the plate 4, and for this purpose reinforcing-rings 12 are employed, which fit against the plate and encircle the lower ends of the said members.

In order to prevent any loss or accidental disarrangement of the leaves, a member 13 is hinged to the rear of the base 1, the said member being adapted to swing upwardly so as to extend above the break 8 and prevent the leaves from coming into contact with the said break. This member 13 may be held in a raised position by any suitable means, such as a hook 14, which engages with an eye upon one of the walls 3. It will thus be apparent that when access is desired to any one of the leaves it is simply necessary to swing the leaves above the given leaf over upon the opposite arm of the arch 5.

Having thus described the invention, what is claimed as new is—

1. In a device of the character described, the combination of a base, an arch secured to the base and provided with a break, a series of leaves provided with openings by which they are loosely mounted upon the arch, the said leaves being adapted to be placed in position or removed from the arch through the before-mentioned break therein, and a swinging member loosely connected to the base and adapted to be swung so as to prevent the leaves from coming into contact with the break in the arch.

2. In a device of the character described, the combination of a base, an arch secured to the base and provided with a break, guide members secured to the base upon each side of the arch, the said guide members being somewhat smaller than and having approximately the same shape as the arch, a series of leaves provided with openings by means of which they are loosely mounted upon the arch, said leaves being adapted to be placed in position or removed from the arch through the before-mentioned break therein, and a swinging member loosely connected to the base and adapted to be swung outwardly to prevent the leaves from coming into contact with the break in the arch.

3. In a device of the character described the combination of a base, a plate mounted upon the base, an arch secured to the plate and provided with a break, a guide member secured to the plate upon each side of the arch, said guide members being somewhat smaller than and having approximately the same shape as the arch so as to engage with the edge of the leaves and prevent the same from being disarranged, and a member hinged to the base and adapted to swing upwardly so as to prevent the leaves from coming into contact with the before-mentioned break in the arch.

In testimony whereof I affix my signature in presence of two witnesses.

DAVID A. HUFFMAN. [L. S.]

Witnesses:
   D. D. ROBERTS,
   JOHN CONDON.